(12) United States Patent
Young et al.

(10) Patent No.: US 7,326,011 B2
(45) Date of Patent: Feb. 5, 2008

(54) CONTOURING RIGHT ANGLE HEAD FOR COMPLEX MACHINING

(75) Inventors: Keith A. Young, St. Peters, MO (US); Samuel I. Easley, St. Peters, MO (US)

(73) Assignee: The Boeing Company, Irvine, CA (US)

( * ) Notice: Subject to any disclaimer, the term of this patent is extended or adjusted under 35 U.S.C. 154(b) by 382 days.

(21) Appl. No.: 11/233,731

(22) Filed: Sep. 23, 2005

(65) Prior Publication Data

US 2007/0071566 A1  Mar. 29, 2007

(51) Int. Cl.
*B23C 1/00* (2006.01)
*B23C 3/00* (2006.01)

(52) U.S. Cl. .................. 409/234; 409/231; 409/215

(58) Field of Classification Search .............. 409/234, 409/230, 215, 211, 233, 144, 235; 408/234, 408/240, 135; 29/560, 27 C, 26 A
See application file for complete search history.

(56) References Cited

U.S. PATENT DOCUMENTS

| | | | | |
|---|---|---|---|---|
| 2,669,162 | A * | 2/1954 | Arliss | 409/144 |
| 4,384,811 | A * | 5/1983 | Eckstein et al. | 409/215 |
| 4,400,859 | A * | 8/1983 | Woythal et al. | 29/27 C |
| 4,417,379 | A * | 11/1983 | Goode | 29/35.5 |
| 4,557,645 | A * | 12/1985 | Marsland | 409/144 |
| 4,565,474 | A * | 1/1986 | Charles | 409/51 |
| 4,614,468 | A * | 9/1986 | Waldrich et al. | 409/211 |
| 4,638,550 | A * | 1/1987 | Malzkorn | 483/18 |
| 4,729,700 | A * | 3/1988 | Hertel et al. | 409/144 |
| 5,017,063 | A * | 5/1991 | Tsay | 409/215 |
| 5,025,548 | A * | 6/1991 | Justesen | 29/560 |
| 5,028,181 | A * | 7/1991 | Jenkins et al. | 409/215 |
| 5,188,493 | A * | 2/1993 | Heel et al. | 409/230 |
| 5,632,580 | A * | 5/1997 | Dube et al. | 409/230 |
| 5,697,739 | A * | 12/1997 | Lewis et al. | 409/230 |
| 5,804,507 | A * | 9/1998 | Perlov et al. | 438/692 |
| 6,183,172 | B1 * | 2/2001 | Shoda | 409/215 |
| 6,519,823 | B1 * | 2/2003 | Sugata et al. | 29/26 A |
| 6,592,305 | B1 * | 7/2003 | Boisvert | 409/131 |

* cited by examiner

*Primary Examiner*—Dana Ross
(74) *Attorney, Agent, or Firm*—Tung & Associates

(57) ABSTRACT

A right angle, modular machining head can be removably mounted on the too head of a CNC machining center to provide contour machining of a work piece around a C-axis. The modular head includes a rotating drive that moves the tool around a contour axis, producing nutational motion allowing close contouring of a work piece. The tool can be powered by a driven spindle on the tool head, or by a motor carried within the modular head. A locating connection between the modular head and the tool head, in combination with a position signals produced by a rotary encoder on the modular head registers the exact position of the tool within the coordinate reference system used by the machining center control system.

20 Claims, 2 Drawing Sheets

CONTOURING RIGHT ANGLE HEAD FOR COMPLEX MACHINING

FIELD OF THE INVENTION

This invention generally relates to machine tools, especially CNC machining centers, and deals more particularly with a detachable, right angle machining head that allows complex contour machining of a workpiece.

BACKGROUND OF THE INVENTION

A variety of sophisticated machining centers are currently available to perform complex machining operations on complicated parts. For example, 5 axis CNC (Computer Numerically Controlled) machining centers are commonly employed to perform machining operations, wherein the cutting tool and/or workpiece are moved along any of three orthogonal axes, while also allowing the cutting tool and/or workpiece to be rotated about two of these axes, commonly called the A-axis and the B-axis, although this rotation is often limited to 45 degrees.

However, even the multiple degrees of movement available in machines of the type described above do not allow precise machining of certain types of complex parts, such as those often encountered in the aircraft industry, where it is necessary to machine small encapsulated corner radii and enclosed return flanges, for example. Certain machining centers are available that are equipped with so called nutating heads which allow machining around a third rotational axis, commonly referred to as the C-axis. These nutating heads are dedicated features of advanced machining centers and are not suited to be added as retrofit items. In addition, machining centers equipped with dedicated nutating heads are expensive.

Accordingly, there is a need in the art for a modular, readily detachable right angle machining head for a machining center to provide C-axis machining capability. The present invention is directed towards satisfying this need.

SUMMARY OF THE INVENTION

In accordance with one aspect of the invention, a right angle head for contour machining of a workpiece includes first and second head portions mounted for rotation on a tool head of a CNC machining center. The first head portion is releasabley mounted on the tool head to allow the right angle head to be easily attached and detached. A right angle drive assembly is mounted for rotation with the second head portion around a contour axis to allow machining a workpiece around a C-axis. A locating connection between the first head portion and the tool head locates the rotational position of the tool about the contour axis in the context of the coordinate system used by the machining center. The locating connection preferably includes a plurality of circumferentially spaced pins between the first head portion and the tool head. The right angle head is driven either by a rotating spindle of the machining center, or by an independent motor carried on the right angle head. A rotary encoder or similar position sensor provides signals to the machining center representing the rotational position of the tool around the contour axis.

According to another aspect of the invention, a removable right angle contour machining head is provided for use with a CNC machining center. The machining head includes a tool rotatable about a rotational C-axis orthogonal to the A-axis and B-axis of the machining center. The tool is carried on a rotatable mounting assembly that is releasable mounted on the tool head, for rotating the tool about a contour axis. A drive motor carried on the mounting assembly powers the machining tool, thereby eliminating the need for driving the tool using the spindle of the machining center.

According to still another aspect of the invention, a removable machining head provides machining operations about a C-axis of rotation and is adapted for use with a computer controlled machining center having a tool head operable for performing machining operations about A and B rotational axis. The machining head includes a mounting assembly having a first portion releasably connected to the tool head and a second portion mounted on the first portion for rotation about a contour axis. A right angle drive assembly is fixed to and rotatable with the second portion of the mounting assembly. A workpiece machining tool driven by the right angle drive assembly rotates about the C-axis and is also rotatable with the second mounting assembly portion about the contour axis so as to produce nutational motion of the machine tool relative to the motion of the tool head. The right angle drive assembly is powered either by a drive spindle of the machining center or, independently by a separate drive motor carried on the mounting assembly.

This invention advantageously provides a modular machining head that can be easily attached and detached from a machining center tool head in order to add C-axis machining capability to machining centers designed to allow machining about only A and B axes. The modular machining head provides rotation about two axes, including a contour axis, permitting rotational motion of the head, which is an important advantage in carrying out complex machining operations for certain types of parts. The head may be self-powered using an internal drive motor, or can be directly driven by a spindle on the machining center. Another feature of the modular head is that rotary encoders or sensors are used to keep track of the exact rotational position of the tool about the contour axis. Through this feature, the precise rotational position of the tool is known to the machining center, even when the modular head is removed and later reattached to the tool head.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
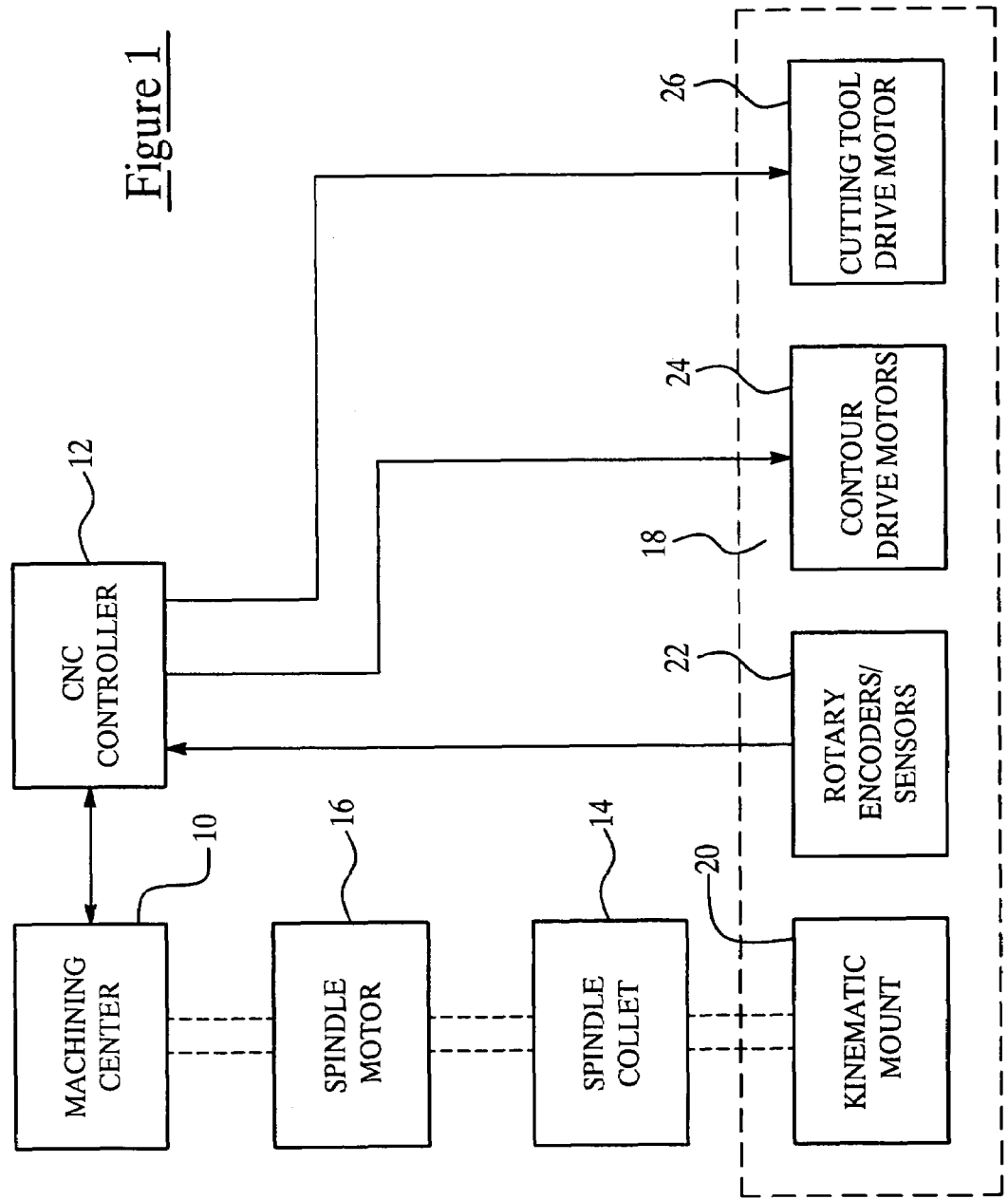
FIG. 1 is a block diagram showing the major components of the contouring right angle head, which forms the preferred embodiment of the invention, in operative relationship to a CNC machining center.
Figure 2:
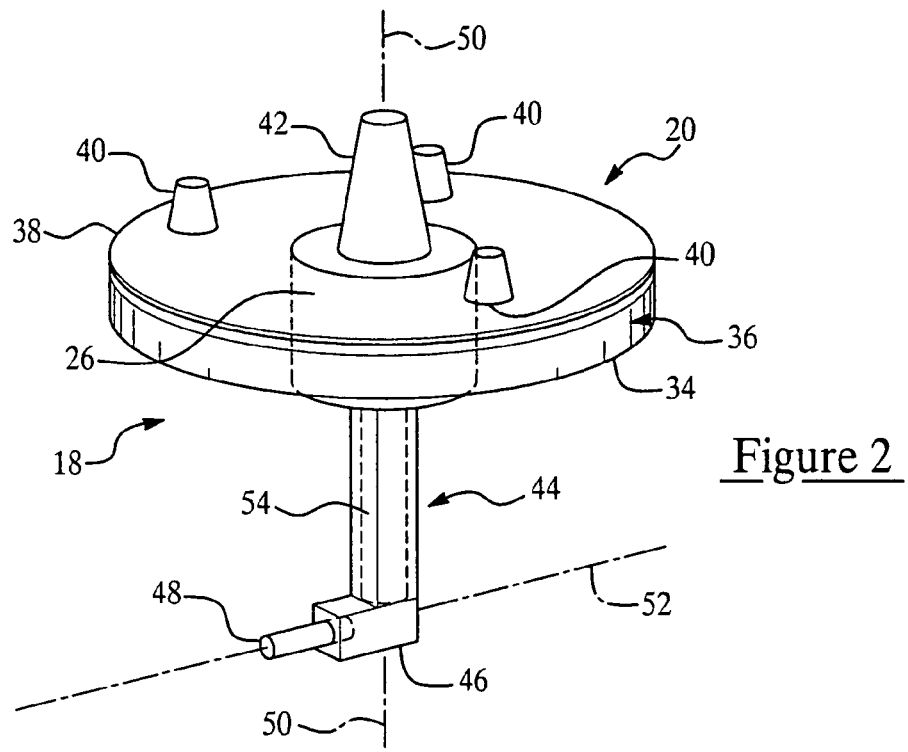
FIG. 2 is a perspective view of the right angle head of the present invention, wherein the spindle motor is used to power the head.
Figure 3:
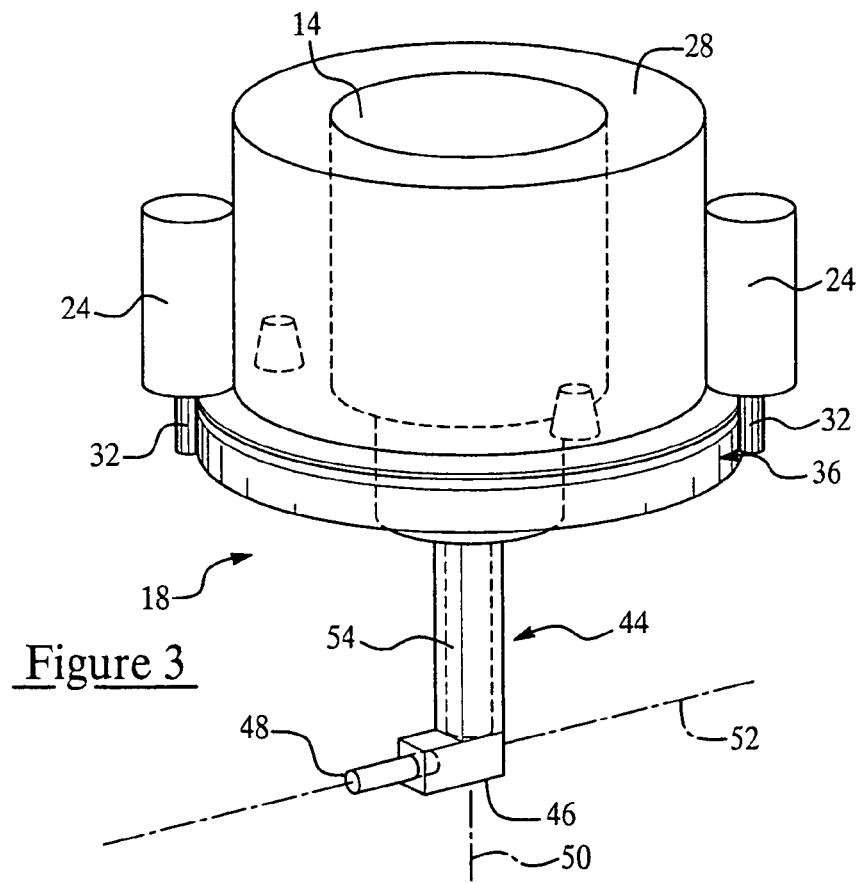
FIG. 3 is a perspective view of the right angle head, similar to FIG. 2, but where in the head is driven by an internal drive motor.

Referring to FIGS. 1-3, the present invention involves a modular, contouring right angle head 18 for performing complex machining operations on a workpiece (not shown). A shown in FIG. 1, the right angle head 18 broadly includes a kinematic mount 20 having or more rotary encoders or rotary position sensors 22, one or more contour drive motors 24, and optionally, a drive motor 26 for powering a machining member such as a cutting tool 48. The right angle head 18 includes a tapered drive shank 42 which is adapted to be received by and locked within a spindle collet 16 carried on a rotating drive spindle a machining center 10. The drive spindle, which includes a spindle motor 16 and a spindle housing 28, forms part of a tool head that is moved in space along two or three reference axes in the machining center 10. More particularly, a machining center 10 may comprise a 5-axis machine in which the tool head and workpiece are moved relative to each other within a coordinance system comprising orthogonal X, Y and Z axes. Further, the tool head and/or the workpiece may be rotated about two orthogonal axes, commonly referred to as the A axis and the B axis.

A CNC controller 12 controls the operations of the machining center 10, including movement of the tool head as well as a spindle motor 14 which drives the spindle to rotate the cutting tool 48. The rotary encoders or sensors 22 output rotary position signals to the controller 12, which are representative of the position of the cutting tool 48, as will be discussed later in more detail. The CNC controller 12 issues control signals to operate later discussed contour drive motors 24. The speed of the cutting tool 48 is determined by the speed of the spindle motor 14. Alternatively, in lieu of driving the right angle head 18 using the spindle motor 14, an optional drive motor 26 controlled by the controller 12 is used to power the cutting tool 48. As will be discussed in more detail below, the kinematic mount 20 allows the right angle head 18 to be removably mounted on the tool head in a manner such that the position of the cutting tool 48 within the coordinate system used by the machining center 10 is known and stored by the controller 12.

Referring now to FIG. 3, the right angle head 18 is removably mounted on the tool head by means of a kinematic mounting assembly 20 comprising a first portion in the form of a circulate mounting disk or plate 38, and a second portion in the form of a cylindrical housing 34 which is rotatable relative to disk 38. The outer face of mounting plate 38 includes three circumferentially spaced, tapered, locating pins 40 which are received within corresponding openings within the face of the spindle housing 28, with the outer face of mounting plate 38 in face-to-face engagement with the face of the spindle housing. The locator pins 40 fix the plate 38 in a single rotational position on the spindle housing 28 and thus on the tool head, while the spindle collet 14 acts to mechanically lock the drive shank 42 on the spindle.

A right angle drive assembly 44 is disposed beneath and fixed for rotation with the housing 34. The drive assembly 44 includes a shaft 54 drivingly connected to the shank 42 and rotatable about an axis 50 referred to herein as the contour axis. The drive assembly 44 includes a pair of bevel gears (not shown) which drivingly connect the shaft 54 with cutting tool 48, and function to translate drive force from the contour axis 50 to the C-axis 52.

Unlike the embodiment shown in FIG. 2 which is powered by the spindle motor 16, the embodiment shown in FIG. 3 is powered by a flat motor 26 mounted within the housing 34 and connected through gearing or the like to shaft 54. Motor 26 may comprise on electric or air operated motor and provides the sole power for driving the cutting tool 48.

As shown in FIG. 2, one or more drive motors 24 are mounted around the periphery of plate 38 and have toothed drive shafts 32 which engage gear teeth 36 formed on the outer periphery of the housing 34. Motors 24 may be electrically driven, and include encoders or similar rotational sensors for sensing the rotational position of the motor 24, and thus of the housing 34 relative to mounting plate 38.

In operation, the right angle head 18 is installed on the tool head of the machining center 10 by inserting the shank 42 into the spindle collet 16 with the locator pins 40 aligned with and received within the corresponding openings in the spindle housing 28. At this point, the rotational position of the right angle head 44, and particularly the cutting tool 48, relative to the contour axis 50 is stored in the controller 12, as a result of the position signals having been sent from the rotary encoders 22 to the controller 12. The controller 12 then moves the tool head through a programmed path such that the cutting tool 48 performs the desired machining operations. The controller 12 drives motors 24 to rotate the housing 38 about the contour axis 50, in turn changing the angle of the cutting tool 48 and thus of the C axis relative to the X, Y and Z axes. This movement in effect produces nutation motion in the path traced by the cutting tool 48, and allows contouring and precise machining of workpiece features.

Due to the kinematic mount 20, when the head is removed and subsequently reinstalled on the tool head, the exact rotary position of the cutting tool 48 is known to the controller and need not be reacquired.

Although this invention has been described with respect to certain exemplary embodiments, it is to be understood that the specific embodiments are for purposes of illustration and not limitation, as other variations will occur to those of skill in the art.

What is claimed is:

1. A right angle head for contour machining a work piece using a CNC machining center having a tool head provided with a drive spindle and performing machining operations about orthogonal A and B rotational axes, comprising:
   a first head portion releasably mounted on the tool head;
   a second head portion mounted for rotation on the first head portion;
   a right angle drive assembly for rotating a machining tool about a C-axis, the right angle drive assembly being fixed to and rotatable with the second head portion about a contour axis orthogonal to the C-axis; and,
   a locating connection carried on the first head portion for locating the rotational position of the tool about the contour axis in a reference coordinate system used by the machining center.

2. The right angle head of claim 1, wherein the locating connection includes at least one pin fixed to the first head portion and removably received within the tool head for fixing the relative angular position of the first head portion and the tool head.

3. The right angle head of claim 1, wherein the locating connection includes a plurality of circumferentially spaced apart pins extending between the first head portion and the tool head for fixing the angular position of the first head portion relative to the tool head.

4. The right angle head of claim 1, including at least one drive motor controlled by the machining center and carried on the first head portion for rotating the second head portion about the contour axis.

5. The right angle head of claim 4, including a rotary encoder for providing signals to the machining center representing the rotational position of the second head portion.

6. The right angle head of claim 1, including a source of power carried on the first head portion for powering the machine tool.

7. The right angle head of claim 1, wherein the right angle drive assembly includes a drive connection releasably coupled to and driven by the drive spindle.

8. A right angle contour machining head for use with a CNC machining center having a tool head for carrying a machining tool, and performing machining operations about orthogonal A and B rotational axes, comprising:
   a tool rotatable about a C-axis orthogonal to the A and B axes, for performing contour machining of a work piece;
   a rotatable mounting assembly releasably mounted on the tool head, for rotating the tool about a contour axis; and
   a drive motor carried on the mounting assembly for powering the machining tool.

9. The machining head of claim 8, wherein the contour axis and the C-axis are orthogonal to each other.

10. The machining head of claim 8, wherein the mounting assembly includes a first portion releasably attached to the tool head, and a second portion rotatable relative to the first portion about the contour axis.

11. The machining head of claim 10, including a right angle drive assembly carried on and rotatable with the second portion of the mounting assembly, the right angle drive assembly being connected between the tool and the drive motor, and translating mechanical drive force from the contour axis to the C-axis.

12. The machining head of claim 10 including a second motor connected between the first and second mounting assembly portions for rotating the second portion relative to the first portion, thereby rotating the tool about the contour axis.

13. The machining head of claim 12, wherein the drive motor and the second motor are connected with and receive control signals from the machining center.

14. The machine head of claim 8, including a device for producing electronic signals indicating the rotational position of the tool about the contour axis.

15. For use with a computer controlled machining center having a tool head and operable for performing machining operations about A and B rotational axes, a removable machining head for performing machining operations about a rotational C-axis, comprising:
   a mounting assembly having a first portion releasably connected to the tool head and a second portion mounted on the first portion for rotation about a contour axis;
   a right angle drive assembly fixed to and rotatable with the second portion of the mounting assembly;
   a work piece machining tool driven by the right angle drive assembly for rotation about the C-axis, and rotatable with the second mounting assembly portion about the contour axis so as to produce nutational motion of the machine tool relative to the motion of the tool head; and,
   a source of power connected to the right angle drive assembly for driving the machine tool.

16. The removable machining head of claim 15, including a drive motor carried on the mounting assembly for driving the second portion to rotate about the contour axis, the drive motor being coupled with and controlled by the machining center.

17. The removable machining head of claim 16, wherein the drive motor delivers signals to the machining center indicating the rotational position of the tool about the contour axis.

18. The removable machining head of claim 15, including a drive motor carried on the mounting assembly for powering the tool.

19. The removable machining head of claim 15, including a locating connection between the mounting assembly and the tool head restricting mounting of the machining head to a single position.

20. The removable machining center of claim 15, wherein the source of power is a rotating spindle on the tool head.

* * * * *